US008432834B2

(12) United States Patent
Shaffer et al.

(10) Patent No.: US 8,432,834 B2
(45) Date of Patent: Apr. 30, 2013

(54) SYSTEM FOR DISAMBIGUATING VOICE COLLISIONS

(75) Inventors: Shmuel Shaffer, Palo Alto, CA (US); Steven Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1359 days.

(21) Appl. No.: 11/500,649

(22) Filed: Aug. 8, 2006

(65) Prior Publication Data

US 2008/0037580 A1 Feb. 14, 2008

(51) Int. Cl.
*H04L 12/16* (2006.01)

(52) U.S. Cl.
USPC .......... 370/260

(58) Field of Classification Search .......... 370/266, 370/259, 260–263, 265, 270, 216, 235, 236, 370/237, 241, 242, 248, 252, 276, 351, 431, 370/437, 442, 445, 447, 458, 461–464, 498, 370/503; 381/17, 371, 310, 307; 379/93.21, 379/202.01, 203.01, 204.01, 205.01, 206.01, 379/207.01, 156–158, 201.01
See application file for complete search history.

(56) References Cited

U.S. PATENT DOCUMENTS 5,440,639 A * 8/1995 Suzuki et al. .......... 381/17
6,101,136 A 8/2000 Mochida
6,301,263 B1 * 10/2001 Maggenti .......... 370/462
6,307,941 B1 * 10/2001 Tanner et al. .......... 381/17
6,408,327 B1 * 6/2002 McClennon et al. .......... 709/204
6,466,832 B1 * 10/2002 Zuqert et al. .......... 700/94
6,542,507 B1 4/2003 Khacherian
6,850,496 B1 * 2/2005 Knappe et al. .......... 370/260
7,068,792 B1 6/2006 Surazski et al.
7,167,567 B1 * 1/2007 Sibbald et al. .......... 381/17
2004/0057405 A1 * 3/2004 Black .......... 370/335
2008/0002668 A1 * 1/2008 Asokan et al. .......... 370/352

OTHER PUBLICATIONS

J. Sjoberg, et al., "RFC 4352 RTP Payload Format for the Extended Adaptive Multi-Rate Wideband (AMR-WB+) Audio Codec", http://www.apps.ietf.org/rfc/rfc4352.html, Network Working Group, Jan. 2006, 32 pages.
H. Schulzrinne , et al., "RFC 1889 RTP: A Transport Protocol for Real-Time Applications", http://www.armware.dk/RFC/rfc/rfc1889.html, Network Working Group, Audio-Video Transport Working Group, Jan. 1996, 69 pages.
C. Perkins et al., "RFC 2198 RTP Payload for Redundant Audio Data", http://rfc.net/rfc2198.html, Network Working Group, Sep. 1997, 11 pages.

* cited by examiner

*Primary Examiner* — Omar Ghowrwal
(74) *Attorney, Agent, or Firm* — Patent Capital Group

(57) ABSTRACT

In one embodiment, techniques for processing voice collisions are provided. A voice collision of two or more voice streams associated with two or more speakers is determined. The voice collision of the two or more voice streams is dynamically disambiguated. The two or more voice streams are then rendered such that the voice collision is disambiguated. The voice collision may be disambiguated using spatial relocation, buffering, etc.

18 Claims, 11 Drawing Sheets

SYSTEM FOR DISAMBIGUATING VOICE COLLISIONS

BACKGROUND OF THE INVENTION

Embodiments of the present invention generally relate to telecommunications and more specifically to techniques for disambiguating voice collisions.

In push-to-talk (PTT) radio systems, a floor control mechanism allows only one talker to talk at a given time. These mechanisms may be used for emergencies where emergency personnel may communicate via short bursts of communication. The voice channel is mostly kept silent to allow important statements to have free air time. This may allow a speaker to immediately be granted floor control when an emergency occurs. However, when only one speaker is granted floor control, then multiple speakers who may need to speak at that time may not talk.

Systems may be provided with the capability of allowing multiple speakers to talk simultaneously in a single group. For example, when more than one speaker talks, the audio from the first three speakers is mixed and rendered at the same time. This may be confusing to a listener as the listener has to listen to three speakers talk at once. If the listener cannot understand what each speaker said, the listener may have to ask the speakers to repeat their last statements again. In some cases, such as in emergency situations, a speaker may not be able to repeat their last statement. Also, in emergency situations, an immediate response to a speaker's statement may be important. However, if a listener cannot interpret what the speakers are saying, then their response may be compromised.

DETAILED DESCRIPTION OF EMBODIMENTS OF THE INVENTION

Overview

Embodiments of the present invention provide techniques for processing voice collisions. In one embodiment, a voice collision of two or more voice streams associated with two or more speakers is determined. The voice collision of the two or more voice streams is dynamically disambiguated. The two or more voice streams are then rendered such that the voice collision is disambiguated.

In one embodiment, a first spatial position for a first voice stream is determined and a second spatial position for the second voice stream is determined. Rendering of the first voice stream in the first spatial position and rendering of the second voice stream in the second spatial position is then provided. This causes voice streams that collided to be rendered in different spatial positions such that a user can distinguish what is being said. Additionally, the user may be able to determine who is speaking based on the spatial positioning.

In another embodiment, when a voice collision of two or more voice streams is determined, a first voice stream may be buffered. A second voice stream may be transmitted without sending the first voice stream. When silence is detected, the first voice stream that was buffered may then be transmitted. This eliminates any voice collisions. Also, an indicator indicating how long the buffered voice stream was delayed may also be provided to the user. For example, the buffered voice stream is spatially located to a position depending on how long it was buffered. When end device 104 receives the second voice stream, it may be rendered before the first voice stream. When an appropriate period of silence has elapsed, the first, buffered, voice stream may be rendered by end device 104.

Figure 1:
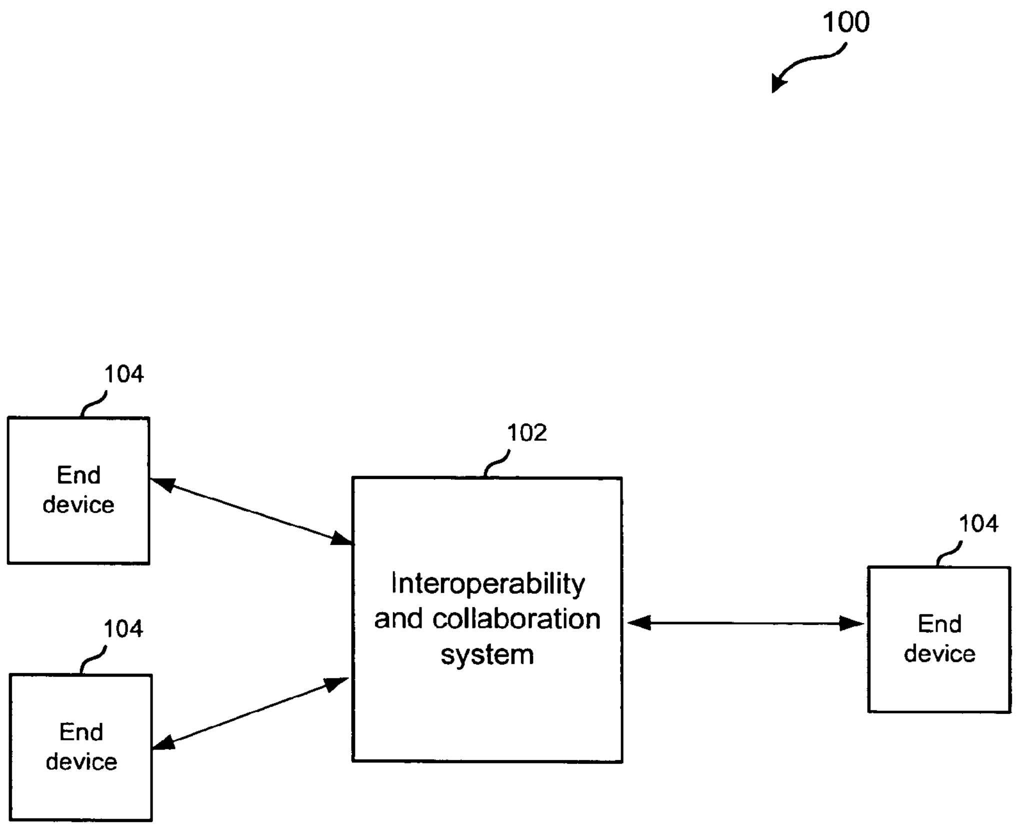
FIG. 1 depicts a simplified system for processing voice collisions according to one embodiment of the present invention.

FIG. 1 depicts a simplified system 100 for processing voice collisions according to one embodiment of the present invention. As shown, system 100 includes an interoperability and collaboration system 102 and end devices 104. In some embodiments, interoperability and collaboration system 102 can also be a Cisco IP Interoperability and Collaboration System (IPICS).

End devices 104 may be any devices that can send/receive a media stream. In one embodiment, end devices 104 may be used by users to send audio information. Also, the media streams may include other information, such as data, graphics, video, signaling, music, etc. End devices 104 may be telephonic devices, such as radios, cellular phones, PSTN telephones, voice-enabled Instant Message (IM) clients, soft phones, computers, personal digital assistants (PDAs), etc. In some embodiments, end device 104 can also be a Cisco Push-to-Talk Management Center (PMC), or a Cisco 7921 IP phone. End devices 104 may also include other networking devices found in a network, such as routers, switches, gateways, etc.

In one embodiment, end devices 104 may include devices in which users use push-to-talk (PTT) when they want to talk in a push-to-talk environment. In the push-to-talk environment, a virtual talk group (VTG) may be formed. A virtual talk group allows a group of users to talk amongst each other using push-to-talk. When the PTT button is selected, a user can speak in the VTG. A media stream may then be sent from end device 104.

At some point, multiple users may be talking at the same time (e.g., by selecting the PTT mechanism and talking at the same time). This may cause a voice collision. A voice collision may be any situation where more than two media streams are received at substantially the same time. Or, a voice collision may be when there are two or more media streams ready to be sent at substantially the same time. This may be when multiple users are pressing the PTT mechanism and are talking. The voice collision may occur at any device, such as at interoperability and collaboration system 102 and/or end device 104.

Embodiments of the present invention are then configured to disambiguate the voice collision. The disambiguation functions performed in embodiments of the present invention may be provided in different devices. For example, in a first embodiment, the media streams travel via interoperability and collaboration system 102 to end devices 104. Interoperability and collaboration system 102 performs the disambiguation of the media streams and sends them to end devices 104.

In a second embodiment, the media streams travel directly between the end devices 104. In this configuration, interoperability and collaboration system 102 provides only control for the creation and maintenance of the VTG but is not involved in the transfer of media streams or the disambiguation of voice collisions. In this configuration the media streams travel directly between end devices 104. End devices 104 perform the disambiguation of the media streams. In a third embodiment, a hybrid scenario of the first two embodiments can be deployed.

In another embodiment, embodiments of the present invention are configured to buffer the colliding streams except for one stream. A single media stream is then rendered at end device 104. When silence is detected, then the buffered media streams may be rendered at end device 104. An indication as to how long the buffered media streams were delayed may also be used. In one embodiment, a spatial relocation of the buffered media streams may be provided to indicate how long the media streams were buffered. The buffering may be performed at any device, such as at interoperability and collaboration system 102 and/or end device 104.

Figure 2:
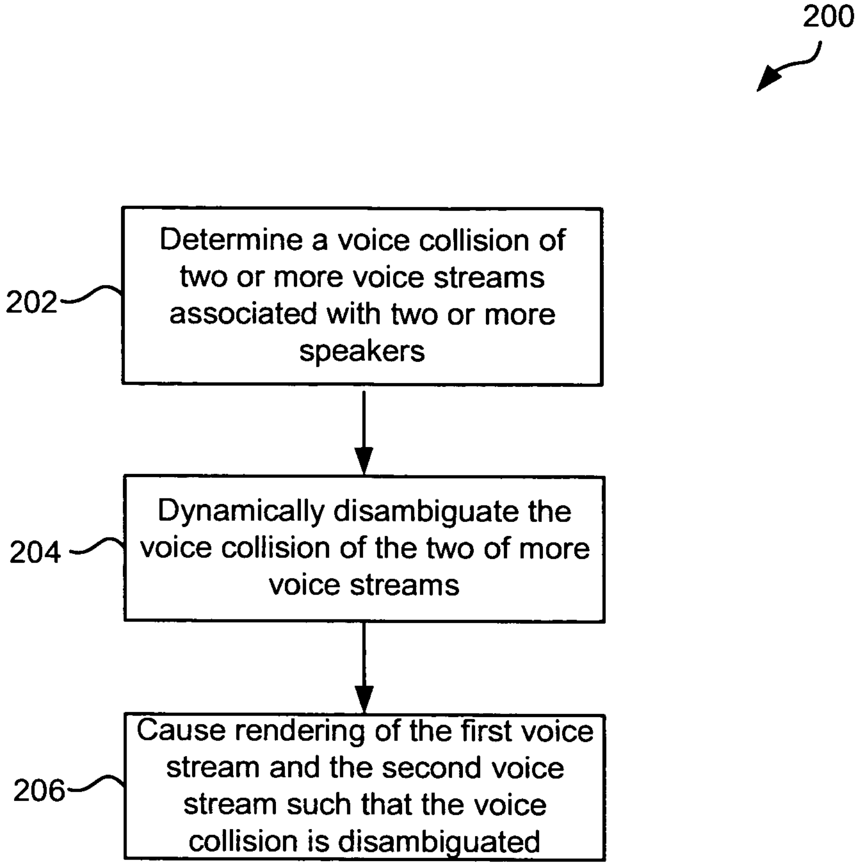
FIG. 2 depicts a simplified flowchart of a method for processing voice collisions according to one embodiment of the present invention.

FIG. 2 depicts a simplified flowchart 200 of a method for processing voice collisions according to one embodiment of the present invention. Step 202 determines a voice collision of two or more voice streams associated with two or more speakers. For example, interoperability and collaboration system 102 and/or end device 104 may receive multiple media streams at substantially the same time. These media streams may collide in that multiple speakers are talking at the same time.

Step 204 dynamically disambiguates the voice collision of the two of more voice streams. As will be described below, the media streams may be spatially relocated. Also, media streams may be buffered such that only one media stream is rendered at a time. Other methods of dynamically disambiguating the voice collision may also be appreciated.

Step 206 facilitates rendering of the voice streams such that the voice collision is disambiguated. In one embodiment, facilitating rendering may include the actual rendering of a stream. That is, the converting of the stream into audio (or any other form). For example, end device 104 may render the streams. In this case, either interoperability and collaboration system 102 or end device 104 may perform the disambiguation. Also, facilitating may also include the forwarding or transmitting of streams such that they can be rendered. For example, interoperability and collaboration system 102 sends the media streams in different spatial locations, which causes end device 104 to render the media streams in the spatial locations. Thus, end device 104 may render the first voice stream and the second voice stream substantially simultaneously, but in different spatial locations. In another embodiment, end device 104 may receive media streams from other end devices 104, and spatially relocate them.

In another embodiment, end device 104 renders the first media stream while the second media stream is buffered. The second media stream may be rendered when silence is detected and therefore the buffered media streams can be played without colliding with another media stream.

The following describes different embodiments for dynamically disambiguating media streams. Although these embodiments are described, it will be understood that other embodiments may be appreciated.

Spatial Relocation Embodiment

Figure 3:
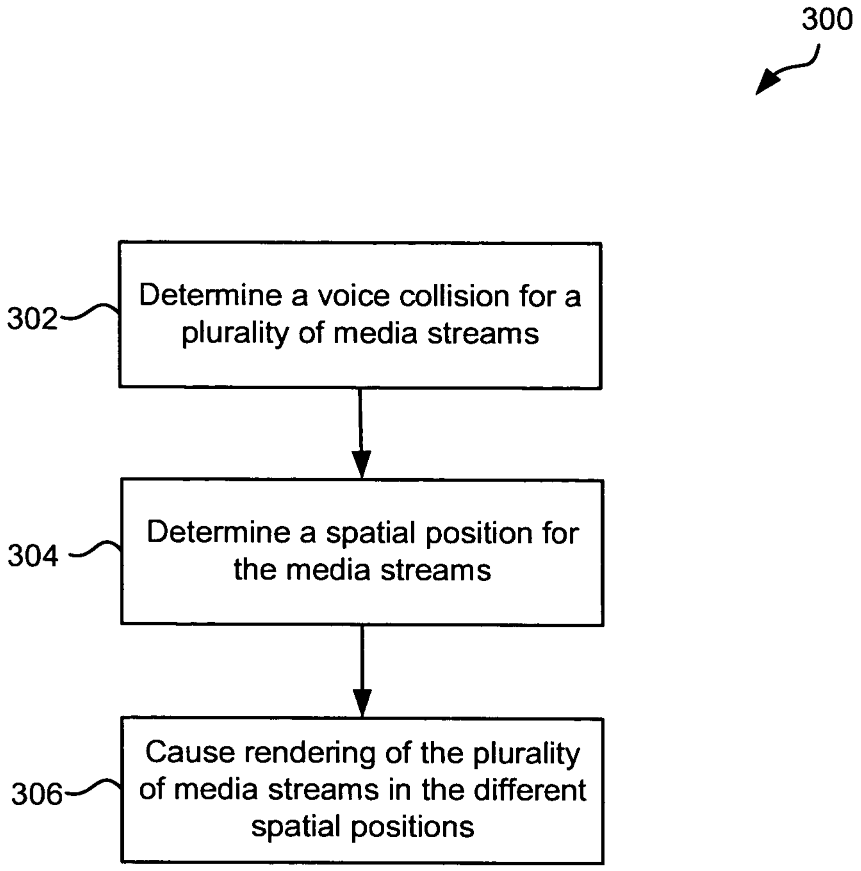
FIG. 3 depicts a simplified flow chart for a method of disambiguating voice collisions using spatial relocation according to one embodiment of the present invention.

FIG. 3 depicts a simplified flow chart 300 for a method of disambiguating voice collisions using spatial relocation according to one embodiment of the present invention. Step 302 determines a voice collision for a plurality of media streams.

Step 304 determines a spatial position for the media streams. The spatial location implies the scaling and placement of media streams to simulate a direction from which the sound is coming. For example, a left spatial location implies the media stream is played almost exclusively into a left ear of a user. The center spatial location implies the media stream is played equally to the right and left ears, a 45° spatial location to the right may imply that the media stream is divided between the right and left in a 75/25 ratio. In one embodiment, the output of the mixing process is a stereo codec, such as defined by AMR-WB+.

In one embodiment, each media stream may be placed into an output media stream at different spatial locations. For example, as many as six simultaneous media streams may be played out in different spatial positions. This allows users to distinguish the media streams as users may be trained to distinguish as many as twelve simultaneous media streams when properly spatially placed.

Step 306 facilitates rendering of the plurality of media streams in the different spatial positions. Different methods of rendering the media streams may be provided. For example, interoperability and collaboration system 102 or end device 104 may place the media streams in different spatial positions, which causes rendering of the media streams in the spatial locations. In one embodiment, interoperability and collaboration system 102 marks each packet (RTP) with an identifier that may be used to determine which spatial location end device (104) is to output the packet in. When end device 104 receives the marked packets, end device 104 may determine which spatial location to render the media stream in. Also, interoperability and collaboration system 102 may remember which spatial location a user was last rendered in and may mark the user's media stream with the same spatial location. This allows a receiver to recognize that a speaker is consistently placed in the same spatial location.

In another embodiment, interoperability and collaboration system 102 may send the colliding media streams to end device 104. End device 104 may then determine how to spatially locate the colliding media streams. For example, end device 104 may decide to output the first media stream in a first spatial location and the second media stream in a second spatial location.

In yet another embodiment, media streams travel directly between end devices 104 and therefore they are not sent by interoperability and collaboration system 102. End device 104 then determines where to spatially relocate the media streams. Although the above ways of spatially locating the media streams are provided, it will be understood that other methods for spatially locating the colliding media streams may be appreciated.

Figure 4:
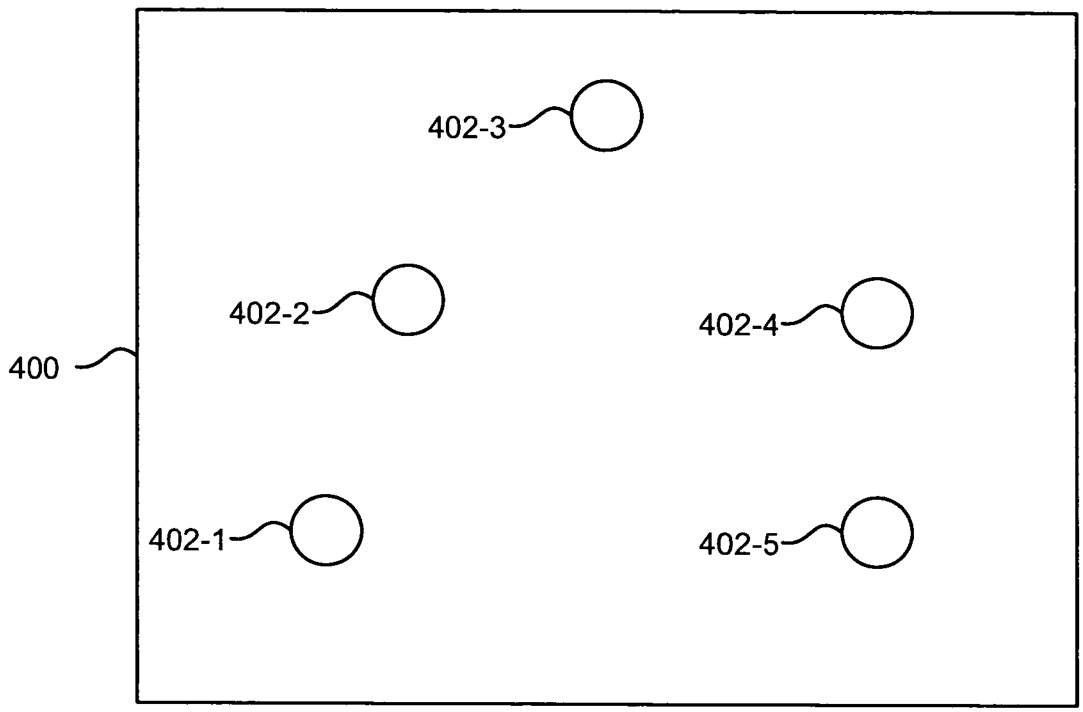
FIG. 4 depicts an example of an interface according to one embodiment of the present invention.

An interface may be provided that visually indicates the spatial locations of speakers that vary. FIG. 4 depicts an example of an interface 400 according to one embodiment of the present invention. Visual indicators 402 are provided that indicate different spatial locations.

As shown, five different spatial locations are shown. Each different location on interface 400 may indicate a different spatial location. For example, indicator 402-1 may be the left spatial location, indicator 402-2 is the left of center spatial location, indicator 402-3 is the center spatial location, indicator 402-4 is the right of center spatial location, and indicator 402-5 is the right spatial location. When voice collisions occur and media streams are spatially located, indicators 402 may change color, light up, change shape, or any other indication may be used to indicate the spatial location. Other features may be appreciated, such as displaying the names or roles for speakers in indicators 402.

Buffering of Media Streams Embodiment

Figure 5:
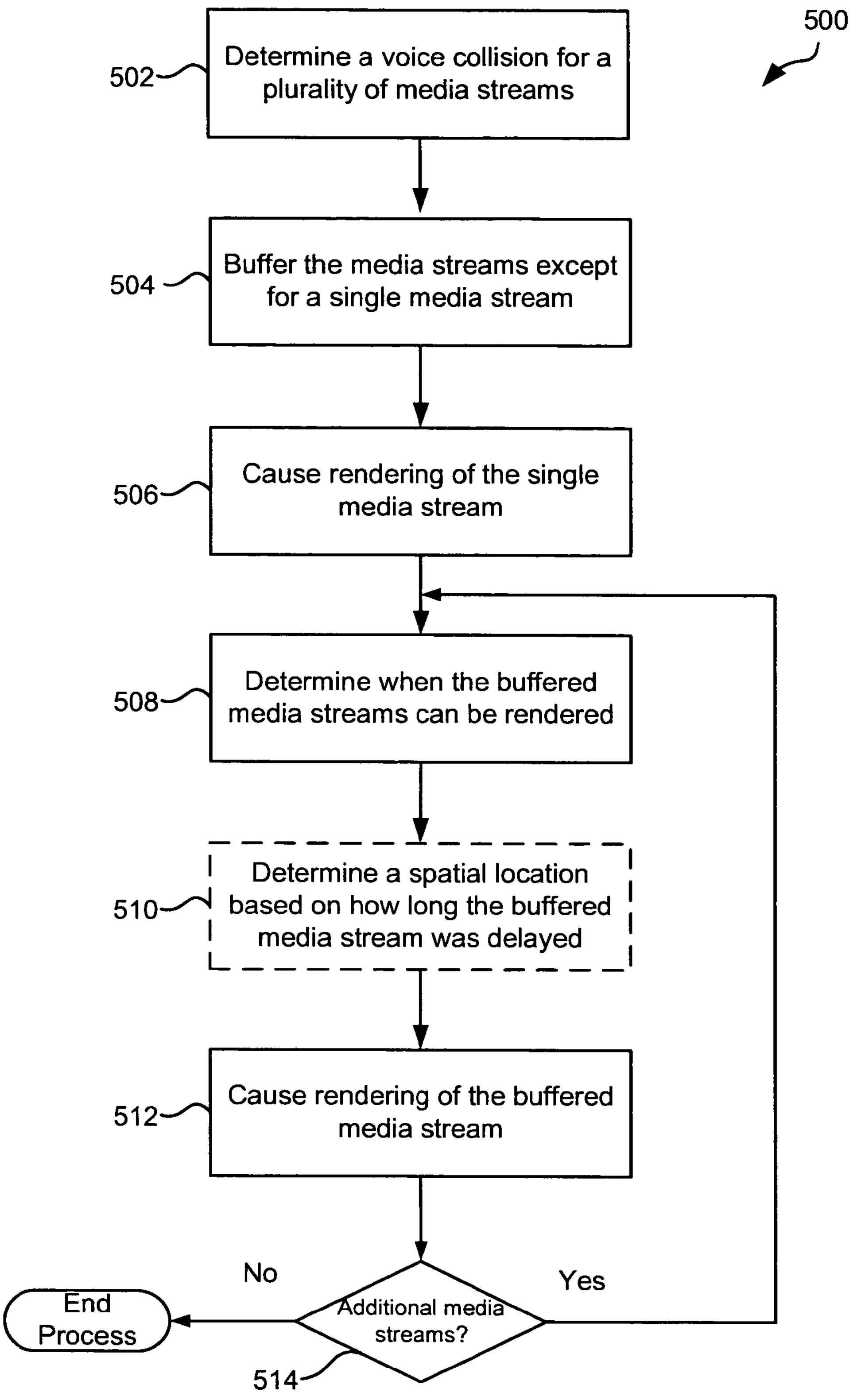
FIG. 5 depicts a simplified flowchart of another embodiment of disambiguating voice collisions according to embodiments of the present invention.

FIG. 5 depicts a simplified flowchart 500 of another embodiment of disambiguating voice collisions according to embodiments of the present invention. Step 502 determines a voice collision for a plurality of media streams. Step 504 buffers the media streams except for a single media stream. The decision of which media stream is played and which is buffered may be determined by the priority of the various speakers. Users with the higher priority are played first. Other pre-configuration may be used to determine in case of collision which media stream gets played and which one is buffered.

Step 506 then facilitates rendering of the single media stream. In one embodiment, the media stream may be a monaural stream. In this case, end device 104 may receive the media stream and render it.

Step 508 determines when the buffered media streams can be rendered. For example, when silence is detected, then the buffered media streams may be rendered. Also, other circumstances may allow the media streams to be rendered, such as after a certain period of time the media streams may be rendered in different spatial locations.

In an optional step, step 510 determines a spatial location based on how long the buffered media stream was delayed. By spatially locating the media streams based on the amount of the delay, a user can determine how long it has been delayed. This may be useful in that user may determine how stale a message is. For example, a one-second delay may be represented by a 5° modification of the direction of arrival. In this example a media stream which is delayed by 6 seconds will be spatially relocated to be rendered from at 30° from the right. Also, all non-real-time media streams that have been delayed for 18 seconds or more may be presented as arriving at 90° from the right (i.e. from straight ahead).

Step 512 then causes rendering of the buffered media stream. The buffered media streams may be rendered as described above. The buffered media streams may be transmitted with a lower bandwidth codec and/or may be marked in a way that indicates they are not the primary stream but buffered media streams. In one embodiment, the buffered media streams may be marked with indicators such that end device 104 can determine that the media streams are buffered and also can determine spatial positioning.

Step 514 then determines if additional media streams are buffered. If so, the process reiterates to step 508 where it determines when another buffered media stream may be rendered. If there are no more buffered media streams, the process ends.

Lower Bandwidth Codec Embodiment

Figure 6:
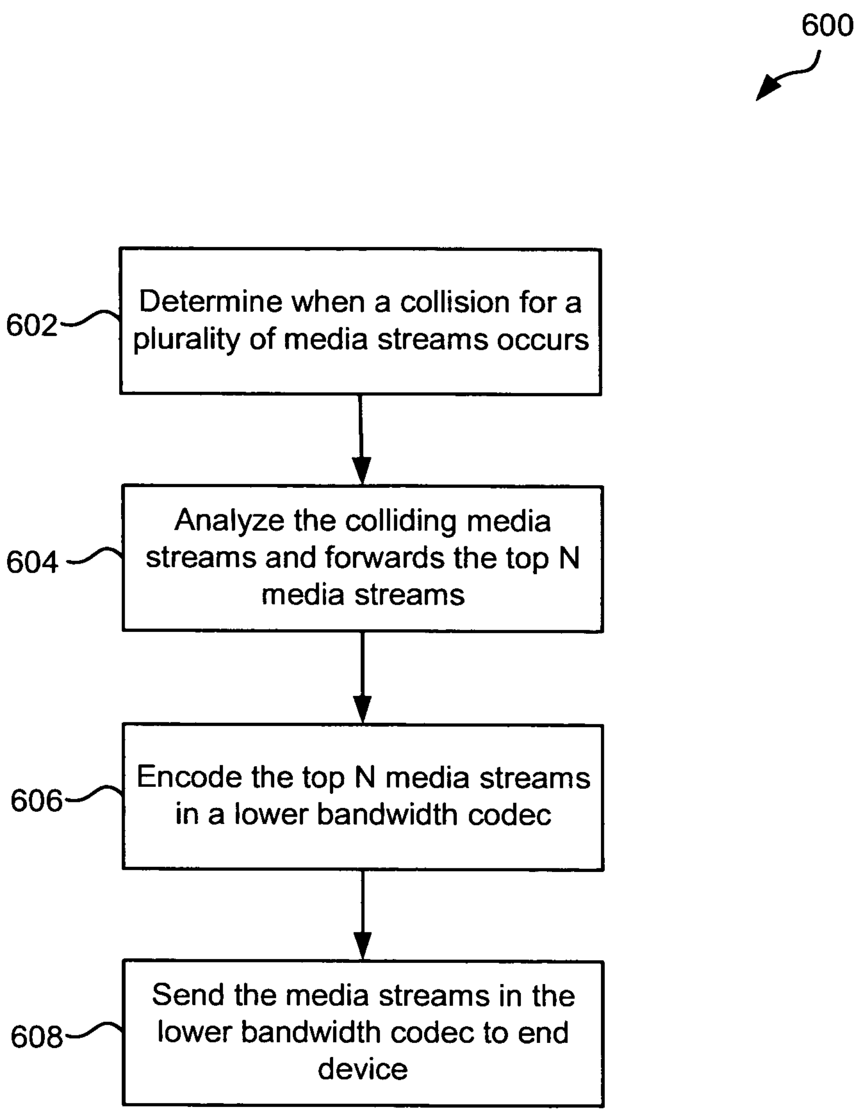
FIG. 6 depicts a simplified flowchart of yet another embodiment for disambiguating voice collisions according to embodiments of the present invention.

FIG. 6 depicts a simplified flowchart 600 of yet another embodiment for disambiguating voice collisions according to embodiments of the present invention. Step 602 determines when a collision for a plurality of media streams occurs.

Step 604 then analyzes the colliding media streams and forwards the top N media streams. It will be understood that any algorithms may be used to determine the top N media streams.

Step 606 then encodes the top N media streams in a lower bandwidth codec.

Step 608 then sends the media streams in the lower bandwidth codec to end device 104. Optionally, the media top N media streams may be marked and transmitted sequentially. In the other embodiment the media streams arrive directly at end device 104 as such there is no need to encode them with any new codec.

Multiple Multicast Groups Embodiment

Figure 7:
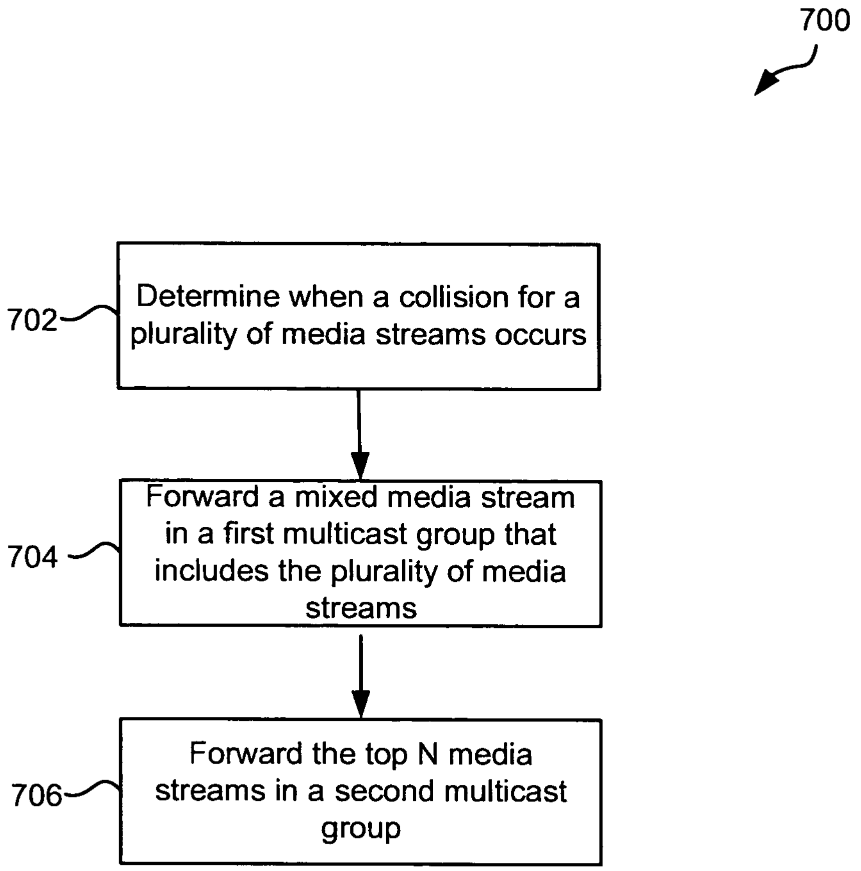
FIG. 7 depicts a simplified flowchart of another embodiment for disambiguating voice collisions according to one embodiment of the present invention.

FIG. 7 depicts a simplified flowchart 700 of another embodiment for disambiguating voice collisions according to one embodiment of the present invention. Step 702 determines when a collision for a plurality of media streams occurs.

Step 704 forwards a mixed media stream in a first multicast group that includes the plurality of media streams. The first multicast group is sent as it was conventionally, i.e., the media streams are mixed and rendered at the same time without spatial relocation. This mixed stream may be used to provide backwards compatibility with systems configured to render the mixed stream.

Step 706 forwards the top N media streams in a second multicast group that allows end device 104 to dynamically disambiguate the top N media streams. The second multicast group may be derived from the first by increasing the port number by 2 or increasing the group address by a fixed offset. The second multicast group may include the colliding media streams. End device 104 may then decide which multicast group to render. For example, the first multicast group may be rendered or the end device 104 may decide to spatially locate the media streams in the second multicast group as described above. Embodiments can encode the non-selected contributing streams (perhaps as an empty packet labeled with all the non-selected media streams). This allows a renderer to indicate that there are unheard streams that have been suppressed. This allows end device 104 to decide if additional bandwidth should be used subscribing to the second multicast group.

EXAMPLES

In one example, users may listen to numerous channels simultaneously. To distinguish between the main channel and secondary channels, users often place the primary channels in the right ear and move less important channels to their left ear. During an event, such as an emergency event, users exchange media streams and two or more speakers may talk at the same time. This causes colliding media streams. In one example, Joe and Mike may be two users who talk on Charles' primary channel. In accordance with one embodiment, Charles has placed the primary channel in his right ear.

When Joe and Mike speak at the same time, the collision of their media streams is detected. In one embodiment, the two media streams are rendered in different spatial directions for a listener Mary. For example, Joe is heard 45° to the left and Mike is heard 45° to the right. The two media streams for Mike and Joe are played out simultaneously. As a result, Mary is able to better distinguish the information that is important to her.

In another embodiment, interoperability and collaboration system 102 mixes the streams and sends the two media streams as well. End device 104 notices the presence of two media streams. End device 104 then may elect to ignore the composite stream (the monaural) and play out the two media streams where each stream is spatially relocated. For example, end device 104 may play the media stream from Joe in Charles' right ear and when Joe's media stream ends and no other media stream competes for Charles' attention, Mike's media stream is played 45° to the right. In one embodiment, because the media stream arrives from 45° to the right, this signifies to Charles that this is a delayed media stream. Alternatively, if the two media streams are inter-mixed, both streams can be played out simultaneously as described earlier.

As discussed above, the spatial location for each media stream may be varied according to the amount of time the media stream has been delayed. For example, if Mike's statement is heard four seconds behind Joe's statement, Mike's non-real-time statement will be played from the buffer at an angle 20° from the right. All non-real-time media streams that have been delayed for 18 seconds or more as arriving at 90° from the right (i.e. from straight ahead).

In another example, embodiments of the present invention may be used in any conference call. For example, when a moderator asks for roll call at the beginning of a conference, users may not be sure when to speak their name as they do not want to speak over another user who may be about to volunteer his/her name. Accordingly, media streams may be buffered and delayed from competing media streams that are colliding and present them sequentially. Thus, a situation where names are garbled is avoided.

System

Figure 8:
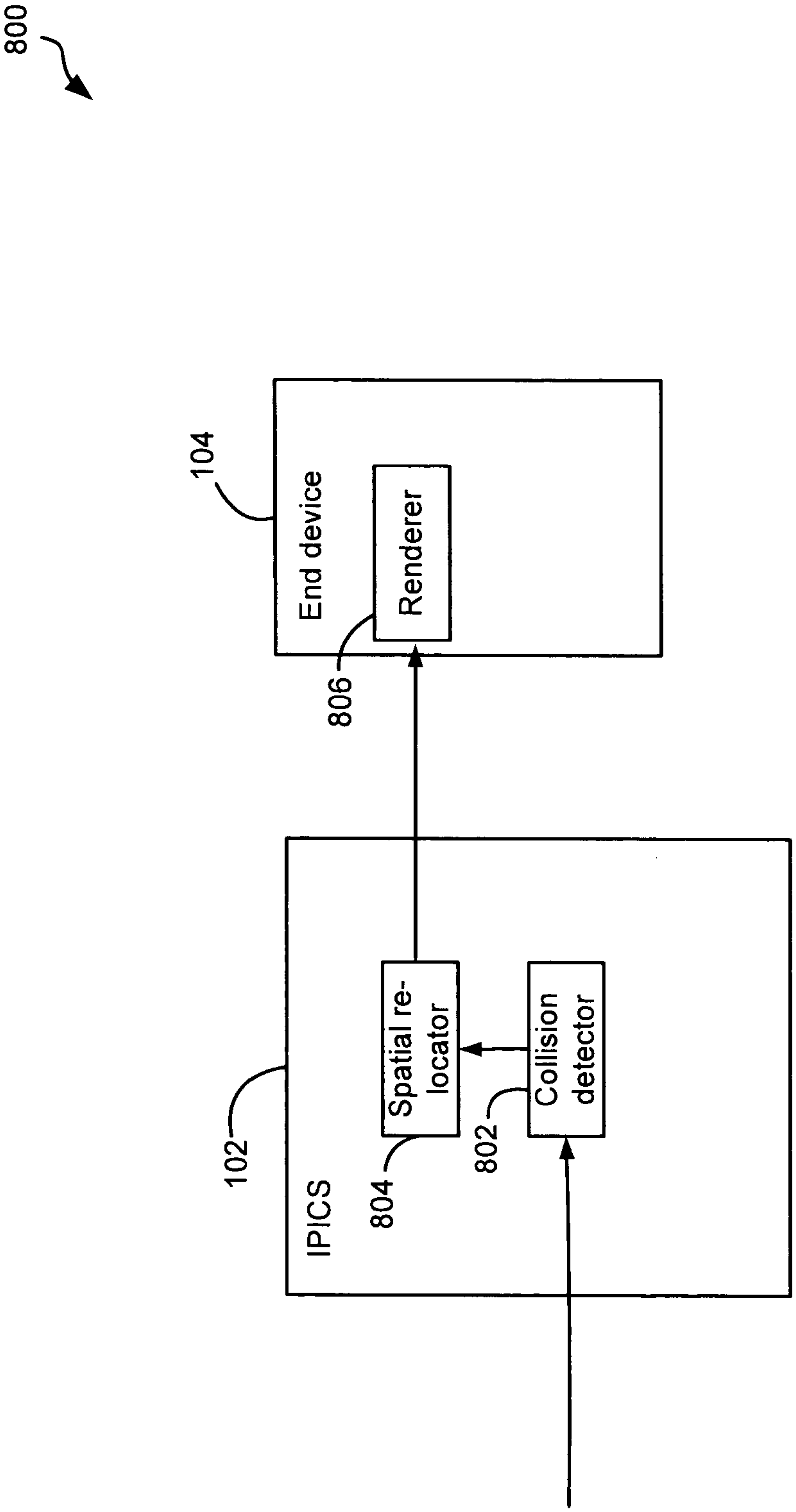
FIG. 8 depicts a simplified system for processing voice collisions using interoperability and collaboration system according to one embodiment of the present invention.

FIG. 8 depicts a simplified system 800 for processing voice collisions using interoperability and collaboration system 102 according to one embodiment of the present invention. As shown, interoperability and collaboration system 102 includes a collision detector 802 and spatial re-locator 804. End device 104 also includes a renderer 806.

Collision detector 802 receives media streams. Collision detector 802 is configured to determine when voice collisions occur. When voice collisions occur, a spatial re-locater 804 is configured to relocate the media streams spatially. This may be performed as described above. The mixed media stream is then sent to renderer 806 in end device 104. Renderer 806 is then configured to render the voice streams spatially.

Figure 9:
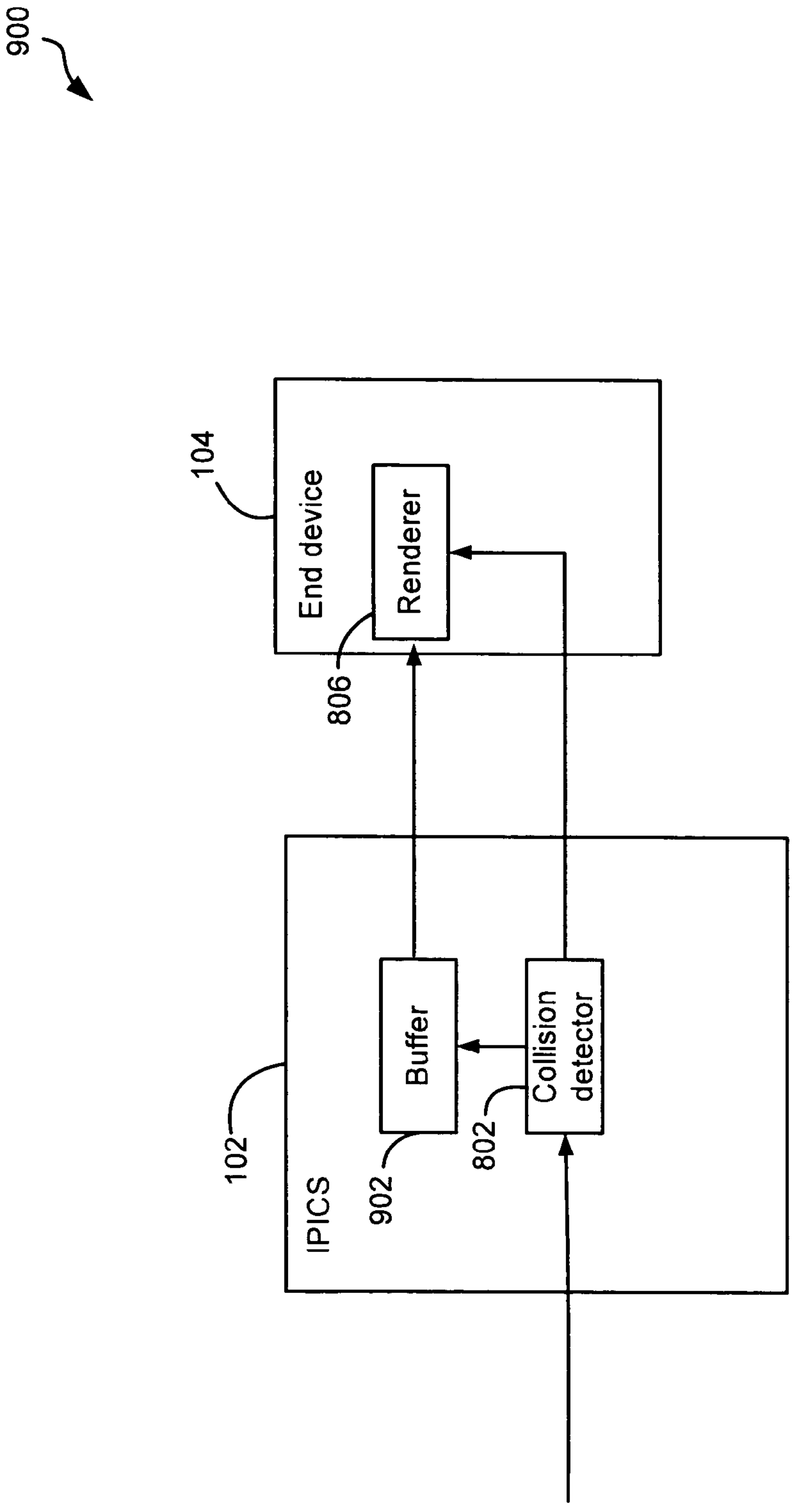
FIG. 9 depicts a simplified system of another embodiment for processing voice collisions using interoperability and collaboration system according to embodiments of the present invention.

FIG. 9 depicts a simplified system 900 of another embodiment for processing voice collisions using interoperability and collaboration system 102 according to embodiments of the present invention. As shown, interoperability and collaboration system 102 includes a collision detector 802 and a buffer 902. End device 104 also includes a renderer 806.

Collision detector 802 receives media streams and is configured to send them to renderer 806. When a voice collision is detected, collision detector 802 may store colliding media streams in buffer 902. A single media stream may be sent to renderer 806 in end device 104 for rendering.

When collision detector 802 detects that a buffered media stream can be rendered, collision detector 802 retrieves the media stream from buffer 902 and sends it to renderer 806. This media stream may be spatially relocated as described above. This process continues as all media streams in buffer 902 are rendered to renderer 806, if possible.

Figure 10:
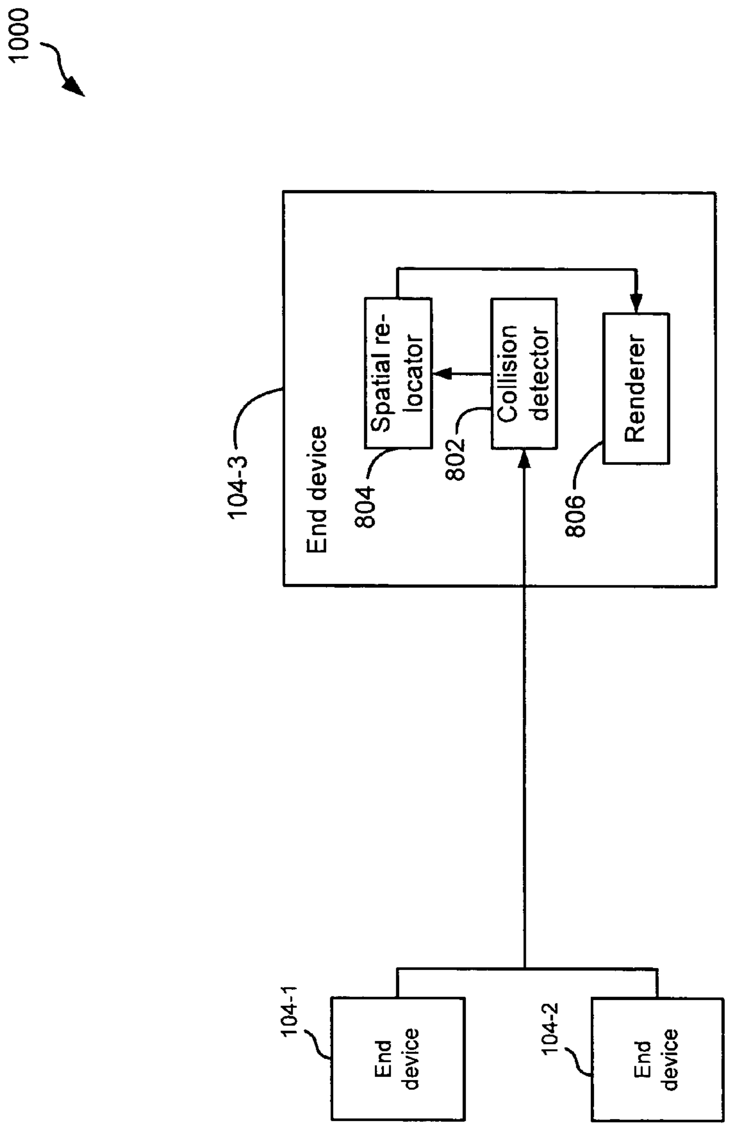
FIG. 10 depicts a simplified system for processing voice collisions using an end device according to one embodiment of the present invention.

FIG. 10 depicts a simplified system 1000 for processing voice collisions using end devices 104-1 through 104-3 according to one embodiment of the present invention. As shown, end device 104 includes a collision detector 802, spatial re-locator 804 and a renderer 806. In this embodiment, end device 104-3 receives media streams from other end devices 104-1 and 104-2. Thus, the media streams do not go through interoperability and collaboration system 102; however, the media streams may pass through other devices as is known in the art.

Collision detector 802 receives media streams. Collision detector 802 is configured to determine when voice collisions occur. When voice collisions occur, a spatial re-locater 804 is configured to relocate the media streams spatially. This may be performed as described above. The mixed media stream is then sent to renderer 806. Renderer 806 is then configured to render the voice streams spatially.

Figure 11:
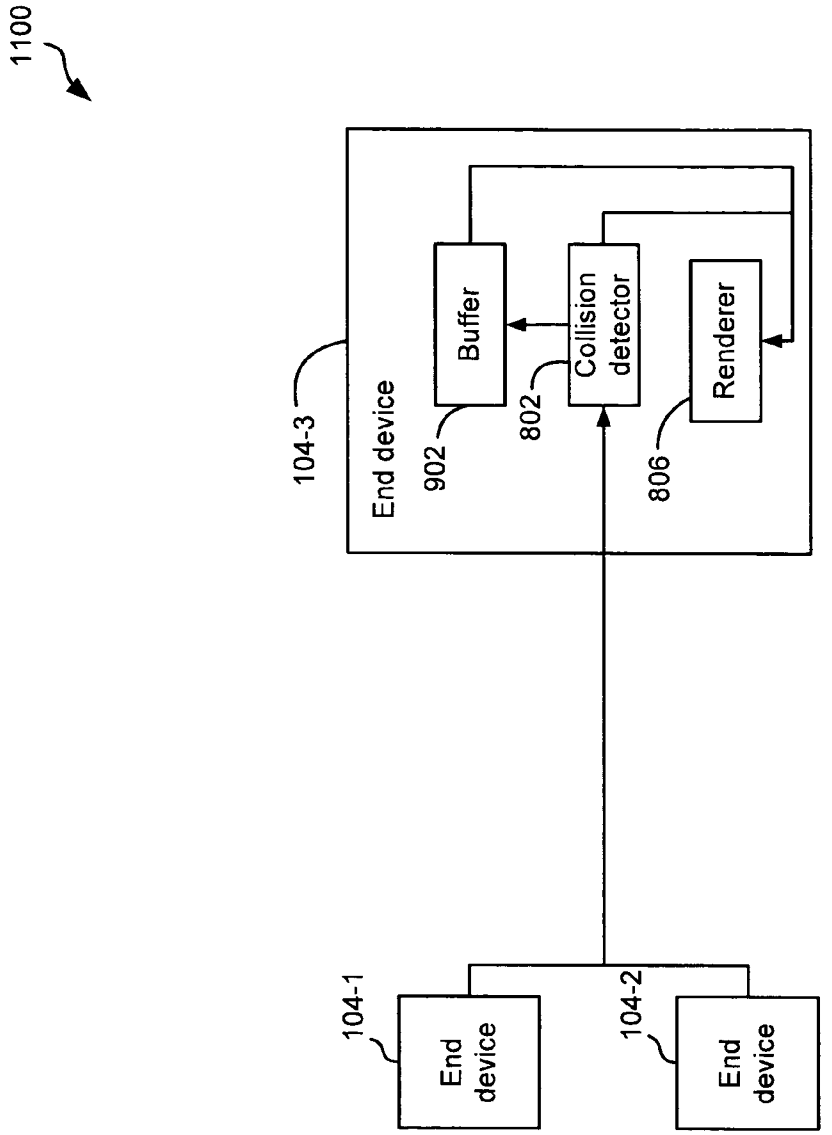
FIG. 11 depicts a simplified system of another embodiment for processing voice collisions using an end device according to embodiments of the present invention.

FIG. 11 depicts a simplified system 1100 of another embodiment for processing voice collisions using end device 104-3 according to embodiments of the present invention. End device 104-3 includes a collision detector 802, a buffer 902, and a renderer 806. In this embodiment, end device 104-3 receives media streams from other end devices 104-1 and 104-2. Again, the media streams do not go through interoperability and collaboration system 102.

Collision detector 802 receives media streams and is configured to send them to renderer 806. When a voice collision is detected, collision detector 802 may store colliding media streams in buffer 902. A corresponding media stream may be sent to renderer 806 for achieving the desired spatial affect.

When collision detector 802 detects that a buffered media stream can be rendered, collision detector 802 retrieves the media stream from buffer 902 and sends it to renderer 806. This media stream may be spatially relocated as described above. This process continues as all media streams in buffer 902 are rendered to renderer 806, if possible.

Advantages

Embodiments of the present invention provide many advantages. For example, nominated mechanism for detecting collisions between media streams is provided. Embodiments of the present invention are different from pre-configured or statically-chosen spatial locations. Rather, when a voice collision occurs, spatial locations are determined dynamically. The media streams are then rendered in different spatial locations that allow the brain of the listener to better process the simultaneous information. For example, embodiments of the present invention provide better scalability than systems with static spatial assignments as it can support dozens of users (most of whom are listening) simultaneously and still provide meaningful spatial separation between any combination of active speakers.

Further, embodiments of the present invention may continuously buffer media streams for use in automatically disambiguating collisions. Embodiments of the present invention may be configured to buffer some of the colliding media streams and present them sequentially to a listener. In presenting the delayed media streams, the media streams may be spatially relocated to indicate the amount of delay.

By disambiguating the voice collisions, valuable radio air time is saved because listeners do not need to ask speakers to repeat their last statement. This also may be important in urgent situations where repeating statements is not desirable or possible.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for processing voice collisions, the method comprising:

determining a collision of two or more voice data streams each generated by a distinct communication device and each associated with a respective one of two or more human participants in a telephonic communication session;

dynamically disambiguating the collision of the two or more voice data streams wherein dynamically disambiguating the collision includes:

buffering at least one of the two or more voice data streams;

facilitating rendering of a first one of the two or more voice data streams for presentation of the first voice data stream at a first spatial location;

determining an opportunity to render a buffered second one of the two or more voice data streams such that a collision with the first voice data stream is disambiguated; and facilitating rendering of the second voice data stream, based at least in part on the determined opportunity, such that presentation of the second voice data stream on a communication device participating in the telephonic communication session is delayed relative to presentation of the first voice data stream on the communication device and presented at a second spatial location other than the first spatial location to indicate that the second voice data stream is presented on a delay;

wherein dynamically disambiguating the collision assists in distinguishing information being said by two or more voices in the telephonic communication session.

2. The method of claim 1, wherein determining the opportunity includes:

determining an instance when other voice data streams in the two or more voice data streams are not being rendered or not being sent for rendering;

wherein the rendering of the second voice data stream is facilitated at the instance.

3. The method of claim 1, further comprising:

determining a duration of the delay from the buffering to the rendering of the second voice data stream; and determining the second spatial location based on the duration of the delay.

4. The method of claim 3, wherein packets for the second voice data stream are marked with information that can be used to determine the second spatial position spatial position.

5. The method of claim 1, wherein dynamically disambiguating the collision comprises:

sending a mixed monaural stream of at least the first voice data stream in a first multicast group; and sending at least the second voice data stream in a second multicast group.

6. The method of claim 1, wherein the disambiguating of the collision is performed at a network device separate from an end device that renders the two or more voice data streams.

7. The method of claim 1, wherein the disambiguating of the collision is performed at an end device that renders the two or more voice data streams.

8. The method of claim 1, further comprising receiving the two or more voice data streams from the distinct communication devices in a push to talk system.

9. The method of claim 1, wherein an indicator includes a visual indicator.

10. The method of claim 1, wherein the first voice data stream is adapted to be presented on a communications device participating in the telephonic communication session in substantially real time and the second voice data stream is adapted to be presented on the communications device on a delay based, at least in part, on the buffering.

11. An apparatus configured to process collisions, the apparatus comprising:

one or more processors; and a memory containing instructions that, when executed by the one or more processors, cause the one or more processors to perform a set of steps comprising:

determining a collision of two or more voice data streams each generated by a distinct communication device and each associated with a respective one of two or more human participants in a telephonic communication session;

dynamically disambiguating the collision of the two or more voice data streams wherein dynamically disambiguating the collision includes:

buffering at least one of the two or more voice data streams for presentation of the first voice data stream at a first spatial location;

facilitating rendering of a first one of the two or more voice data streams;

determining an opportunity to render a buffered second one of the two or more voice data streams such that a collision with the first voice data stream is disambiguated; and facilitating rendering of the second voice data stream, based at least in part on the determined opportunity, such that presentation of the second voice data stream on a communication device participating in the telephonic communication session is delayed relative to presentation of the first voice data stream on the communication device and presented at a second spatial location other than the first spatial location to indicate that the second voice data stream is presented on a delay;

wherein dynamically disambiguating the collision assists in distinguishing information being said by two or more voices in the telephonic communication session.

12. The apparatus of claim 11, wherein determining the opportunity includes:

determining an instance when other voice data streams in the two or more voice data streams are not being rendered or not being sent for rendering;

wherein the rendering of the second voice data stream is facilitated at the instance.

13. The apparatus of claim 11, wherein the instructions cause the one or more processors to perform further steps comprising:

determining a duration of the delay from the buffering to the rendering of the second voice data stream; and determining the second spatial location based on the duration of the delay.

14. The apparatus of claim 11, wherein the instructions cause the one or more processors to perform further steps comprising:

sending a mixed monaural stream of at least the first voice data stream in a first multicast group; and sending at least the second voice data stream in a second multicast group.

15. The apparatus of claim 11, wherein the disambiguating of the collision is performed at a network device separate from an end device that renders the two or more voice data streams.

16. The apparatus of claim 11, wherein the disambiguating of the collision is performed at an end device that renders the two or more voice data streams.

17. The apparatus of claim 11, wherein the instructions cause the one or more processors to perform a further step comprising:

receiving the two or more voice data streams from the distinct communication devices in a push to talk system.

18. A system comprising:

at least one processor device;

at least one memory element; and a disambiguation engine, adapted when executed by the at least one processor device to:

determine a collision of two or more voice data streams each generated by a distinct communication device and associated with a respective one of two or more human participants in a telephonic communication session, wherein determining the collision includes predicting that the colliding two or more voice data streams would result in a conflicting audio presentation of the two or more voice streams;

dynamically disambiguate the collision of the two or more voice data streams wherein dynamically disambiguating the collision includes:

buffering at least one of the two or more voice data streams;

facilitating rendering of a first one of the two or more voice data streams for presentation of the first voice data stream at a first spatial location;

determining an opportunity to render a buffered second one of the two or more voice data streams such that a collision with the first voice data stream is disambiguated; and facilitating rendering of the second voice data stream, based at least in part on the determined opportunity, such that presentation of the second voice data stream on a communication device participating in the telephonic communication session is delayed relative to presentation of the first voice data stream on the communication device and presented at a second spatial location other than the first spatial location to indicate that the second voice data stream is presented on a delay;

wherein dynamically disambiguating the collision assists in distinguishing information being said by two or more voices in the telephonic communication session.

* * * * *